(12) United States Patent
Shen (10) Patent No.: US 7,570,818 B2
(45) Date of Patent: Aug. 4, 2009

(54) METHOD FOR DEBLOCKING AND TRANSCODING A MEDIA STREAM

(75) Inventor: Bo Shen, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1029 days.

(21) Appl. No.: 10/688,082

(22) Filed: Oct. 17, 2003

(65) Prior Publication Data

US 2005/0084157 A1    Apr. 21, 2005

(51) Int. Cl.
*G06K 9/36* (2006.01)
*G06K 9/40* (2006.01)
*H04N 7/12* (2006.01)

(52) U.S. Cl. .................. 382/232; 382/268; 382/275; 375/240.18; 375/240.24

(58) Field of Classification Search ......... 382/232–254, 382/272, 266–269, 274–275; 375/240–241
See application file for complete search history.

(56) References Cited

U.S. PATENT DOCUMENTS

| | | | | |
|---|---|---|---|---|
| 4,751,742 A | * | 6/1988 | Meeker | 382/240 |
| 4,754,492 A | * | 6/1988 | Malvar | 382/268 |
| 5,086,488 A | * | 2/1992 | Kato et al. | 382/239 |
| 5,274,442 A | * | 12/1993 | Murakami et al. | 375/240.2 |
| 5,432,615 A | * | 7/1995 | Watanabe | 382/251 |
| 5,563,718 A | * | 10/1996 | Wober et al. | 382/250 |
| 5,654,759 A | * | 8/1997 | Augenbraun et al. | 375/240.03 |
| 5,694,492 A | * | 12/1997 | Kim | 382/262 |
| 5,737,451 A | * | 4/1998 | Gandhi et al. | 382/268 |
| 6,208,688 B1 | * | 3/2001 | Seo et al. | 375/240.03 |
| 6,587,508 B1 | * | 7/2003 | Hanamura et al. | 375/240.24 |
| 6,987,808 B2 | * | 1/2006 | Mine | 375/240.03 |

OTHER PUBLICATIONS

Hani Sorial, William E. Lynch and Andre Vincent, "Selective Requantization for Transcoding of MPEG Compressed Video", 2000, IEEE International Conference on Multimedia and Expo, vol. 1, pp. 217-220.*

Alexandros Eleftheriadis, et al.; "Constrained and General Dynamic Rate Shaping of Compressed Digital Video"; Oct. 1995; 2nd IEEE International Conference on Image Processing (ICIP-95); pp. 1-4.

Gertjan Keesman, et al.; "Transcoding of MPEG Bitstreams"; Signal Processing: Image Communication 8 (1996); pp. 481-500.

G. A. Triantafyllidis, et al.; "Blocking Artifact Reduction in Frequency Domain"; 2001 IEEE; pp. 269-272.

* cited by examiner

*Primary Examiner*—Daniel G Mariam
*Assistant Examiner*—Manav Seth (57) ABSTRACT

A method for deblocking and transcoding a media stream. A coefficient associated with a block of pixels of the media stream is received. A deblocking operation is performed on the coefficient to generate a second coefficient. Quantization is performed on the second coefficient to generate a transcoded coefficient.

25 Claims, 9 Drawing Sheets

Receive a plurality of first coefficients and a plurality of second coefficients, a first quantization step size, a second quantization step size, and a quantization operation.
310

Performing the quantization operation for a first coefficient of the plurality of first coefficients and a second coefficient of the plurality of second coefficients, the quantization operation based on the first quantization step size and the second quantization step size.
320

Determine whether the first coefficient is responsive based on the quantization operation.
330

More coefficients?
340
— Yes

No

Generate a coefficient responsiveness table comprising a distribution of responsiveness of the plurality of first coefficients for the first quantization step size.
350

FIG. 8

METHOD FOR DEBLOCKING AND TRANSCODING A MEDIA STREAM

TECHNICAL FIELD

Embodiments of the present invention relate to the field of digital media. Specifically, embodiments of the present invention relate to a method and system for deblocking and transcoding a media stream.

BACKGROUND ART

One of the important video transcoding applications is bit rate reduction transcoding. Rate reduction transcoding is typically achieved using either truncation based transcoding or by requantization-based transcoding. Selective coefficient truncating transcoding typically achieves a relatively small amount of bit rate reduction and is rarely used often in typical video transcoding applications.

Requantization-based transcoding achieves rate reduction by requantization using coarser quantization steps. Since the transform-domain coefficients are coarsely quantized, blocking artifacts may be produced. In particular, blocking artifacts arise as a result of each block being compressed independently. Blocking artifacts may appear as edges or produce ringing between blocks.

Numerous methods have been developed to reduce the blocking artifacts for decoded pixel blocks. Specifically, current deblocking applications typically decode the pixel blocks before deblocking and re-encode the pixel blocks after decoding. However, for transcoding applications, the decoding and re-encoding cycle may result in increased blocking artifacts, as the decoding and re-encoding may rely on information that is not be available. Furthermore, due to the higher compression provided by transcoding applications, blocking artifacts get worse as the compression is increased. For example, requantization-based transcoding applies the requantization on the transform-domain coefficients so that a costly inverse transformation is avoided. Currently, deblocking cannot be performed in conjunction with transcoding in the transform domain.

DISCLOSURE OF THE INVENTION

Various embodiments of the present invention, a method for deblocking and transcoding a media stream, are described. A coefficient associated with a block of pixels of the media stream is received. A deblocking operation is performed on the coefficient to generate a second coefficient. Quantization is performed on the second coefficient to generate a transcoded coefficient.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be implemented in a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Method and System for Deblocking and Transcoding a Media Stream

Figure 1:
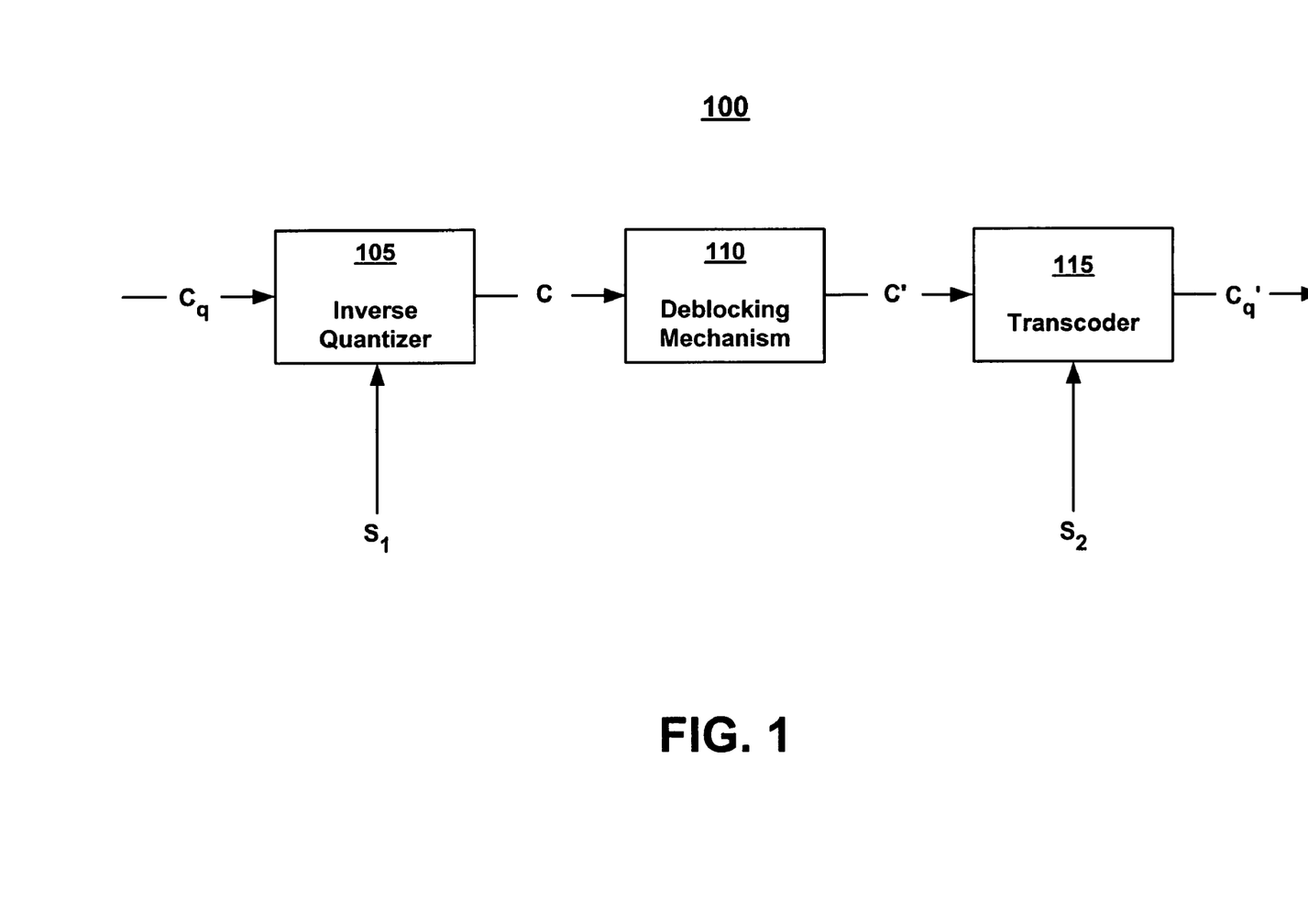
FIG. 1 illustrates a block diagram of transcoding system in accordance with an embodiment of the present invention.

FIG. 1 illustrates a block diagram of transcoding system 100 in accordance with an embodiment of the present invention. Transcoding system 100 utilizes requantization for bit rate reduction transcoding and has deblocking capability. Transcoding system 100 comprises three modules: inverse quantizer 105, deblocking mechanism 110, and transcoder 115. It should be appreciated that transcoding system 100 may be implemented within a computer system.

Transcoding system 100 receives a coefficient associated with a block of pixels of a media stream. Embodiments of the present invention pertain to media stream for transmitting graphical data, such as video streams. For brevity and clarity, the term video stream is used in the present application. In one embodiment, the coefficient is a quantized coefficient $C_q$. In one embodiment, quantized coefficient $C_q$ is received from a compressed video stream. In one embodiment, quantized coefficient $C_q$ is a discrete cosine transform (DCT) coefficient.

Inverse quantizer 105 is operable to perform an inverse quantization operation ($Q_1^{-1}$) on quantized coefficient $C_q$ using quantization step size $s_1$. Inverse quantizer 105 outputs dequantized coefficient C. It should be appreciated that the accuracy of dequantized coefficient C may not be known because information of the original coefficient may be unavailable. Since it is a lossy reconstruction, dequantized coefficient C may bring blocking artifacts to the reconstructed picture. It should also be appreciated that embodiments of the invention may not require inverse quantizer 105 where the coefficient received at transcoding system 100 is already dequantized.

Deblocking mechanism 110 is operable to perform a deblocking operation on dequantized coefficient C. In one embodiment, a DCT domain deblocking operation is performed to obtain a second coefficient C'. DCT domain deblocking operations modify DCT coefficients depending on the neighboring coefficients in the subbands. It should be appreciated that DCT domain deblocking operations are understood in the art. An example of a DCT domain deblocking operation is described in Triantafyllidis et al., "Blocking Artifact Reduction in Frequency Domain," *Proc. ICIP* 2001, pp 269-272, 2001, which is incorporated herein by reference as background material.

Transcoder 115 is operable to requantize second coefficient C' using quantization step size $s_2$, resulting in transcoded coefficient $C_q'$ (e.g., a re-quantized coefficient). In one embodiment, quantization step size $s_2$ is produced by a rate control module of transcoder 115 that regulates the bit budget spent for each macroblock depending on a block complexity measure and current bit-consumption status. In one embodiment, quantization step size $s_2$ is less than quantization step size $s_1$. Therefore, transcoded coefficient $C_q'$ is less than or equal to quantized coefficient $C_q$, possibly requiring a fewer number of bits to code transcoded coefficient $C_q'$. Bit rate reduction is thus achieved.

It should be understood that in video transcoding, coefficients modified after a deblocking operation are still subject to transcoding (e.g., re-quantization) that may render the deblocking modification ineffective. In particular, some coefficients may be responsive to a deblocking operation while other coefficients may be unresponsive to a deblocking operation.

Figure 2:
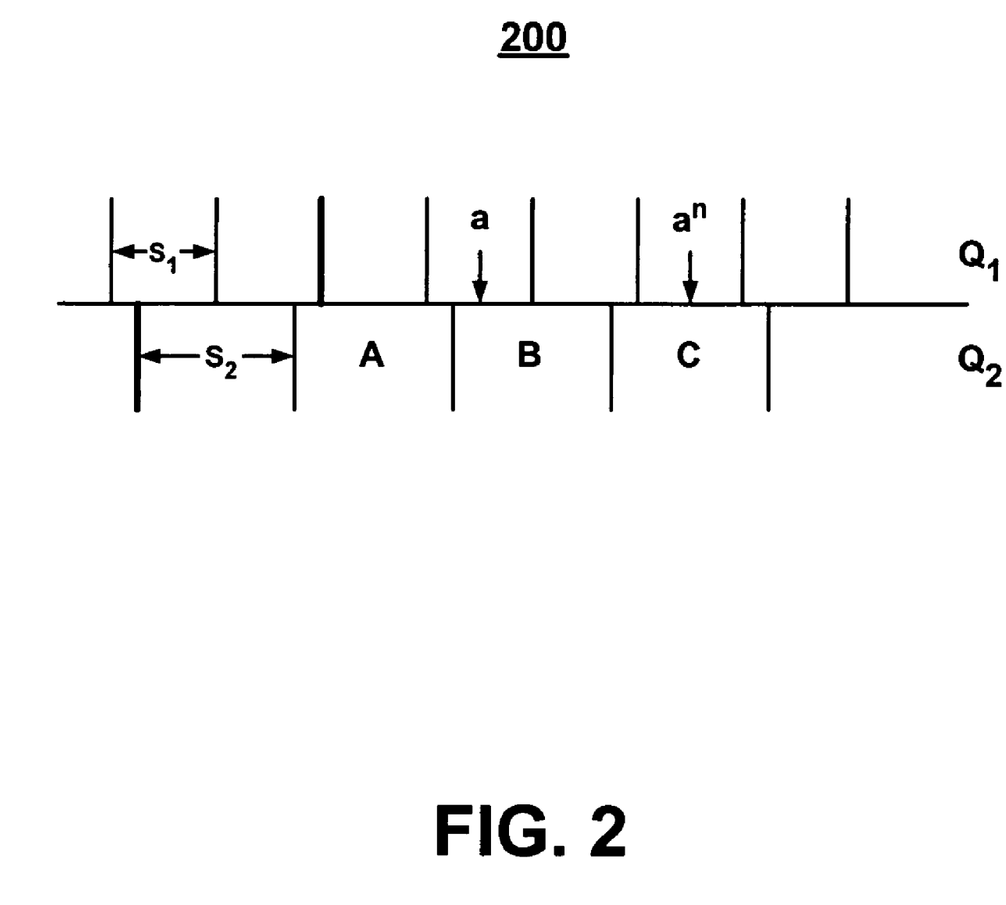
FIG. 2 illustrates a graph of exemplary quantization bins for two quantizers in accordance with an embodiment of the present invention.

Embodiments of the invention are directed towards determining whether a coefficient is responsive to deblocking in order to accelerate the deblocking operation in transcoding. FIG. 2 is an example illustrating that some coefficients may be responsive to a deblocking operation while other coefficients may be unresponsive to a deblocking operation. Specifically, FIG. 2 illustrates a graph 200 of exemplary quantization bins for two quantizers in accordance with an embodiment of the present invention. In one embodiment, quantizer $Q_1$ and quantizer $Q_2$ are both uniform scalar quantizers, Graph 200 illustrates two different sets of bins generated with two different quantization steps. The original quantization step size for quantizer $Q_1$ is quantization step size $s_1$ and the transcoding step size for quantizer $Q_2$ is quantization step size $s_2$.

For illustrative purposes, if an input coefficient falls into bin a of quantizer $Q_1$, the reconstructed coefficient is represented by the middle value of bin a, as represented by the arrow. After deblocking, the adjusted coefficient can vary within the range of bin a. Consequently, the requantization result can fall either in bin A or bin B of quantizer $Q_2$. If a post-deblocking coefficient may end up in different bins of $Q_2$, the coefficient is responsive to deblocking. Alternatively, if an input coefficient falls into bin a', the post-deblocking coefficient always falls into bin C regardless of how the deblocking process alters a' since the whole range of a' is within C. The input coefficient is unresponsive to deblocking. Therefore, for unresponsive coefficients, no deblocking operation need be applied on them, as deblocking is ineffective.

The value of the unresponsive coefficients can be derived as follows given the quantizer functions $f$, quantization steps $s_1$ and $s_2$. Assuming a uniform scale quantizer with rounding to nearest, the inverse quantization function $f^1$ is considered. Given an input DCT coefficient (a quantized DCT coefficient) $C_q=n$, the reconstructed coefficient is $C_n=f^1(C_g,s)=ns$, where s is the quantization step size. The quantization lower bound of $C_n$ is defined as:

$$C_n^L = ns - \lfloor s/2 \rfloor \tag{1}$$

and the upper bound is defined as:

$$C_n^U = ns - \lfloor s/2 \rfloor + s - 1 \tag{2}$$

Note that the round-to-nearest quantizing (values at 0.5 are rounded to the larger magnitude) leads to the round-down term in Equations (1) and (2). Let i that belongs to $C_q$, the set of input coefficients, and j that belongs to $C_q'$, the set of coefficients after requantization, $C_q$ and $C_q'$ are subsets of integers, from Equations (1) and (2) results in:

$$C_i^L = is_1 - \lfloor s_1/2 \rfloor, \; C_i^U = is_1 - \lfloor s_1/2 \rfloor + s_1 - 1$$

$$C_j^L = js_2 - \lfloor s_2/2 \rfloor, \; C_j^U = js_2 - \lfloor s_2/2 \rfloor + s_2 - 1 \tag{3}$$

The set of unresponsive coefficients is defined as:

$$U = \{i | \forall i,j \in int, \; C_i^L \geq C_j^L \text{ and } C_i^U \leq C_j^U \} \tag{4}$$

Plugging Equation (3) into the condition items in Equation (4) and noting that $\lceil s/2 \rceil + \lfloor s/2 \rfloor = s$, a quantization theorem is derived. Specifically, for a uniform scalar quantizer (round-to-nearest quantizing), given first quantizer step size $s_1$ and requantizer step size $s_2$, the magnitude of unresponsive coefficients i that belongs to $C_q$, satisfies:

$$\left(js_2 - \left\lfloor \frac{s_2}{2} \right\rfloor + \left\lfloor \frac{s_1}{2} \right\rfloor \right)/s_1 < i < \left(js_2 + \left\lceil \frac{s_2}{2} \right\rceil - \left\lceil \frac{s_1}{2} \right\rceil \right)/s_1 \tag{5}$$

and the magnitude of the responsive coefficients i' fall into the intervals defined by:

$$\left(js_2 + \left\lceil \frac{s_2}{2} \right\rceil - \left\lceil \frac{s_1}{2} \right\rceil \right)/s_1 < i' < \left(js_2 + \left\lceil \frac{s_2}{2} \right\rceil + \left\lceil \frac{s_1}{2} \right\rceil \right)/s_1 \tag{6}$$

where j belongs to $C_q'$.

Alternatively, if round-down instead of round-to-nearest is considered in quantizing, the intervals for responsive coefficients become:

$$\frac{s_1}{s_2}(j+1) - 1 < i' < \frac{s_1}{s_2}(j+1) \qquad (7)$$

Equation (7) considers a round-down scheme with uniform scalar quantizer only. It should be appreciated that other scalar quantizers can be used. For example, a round-down scheme with dead zone quantizer (for quantization of inter pictures in MPEG) can be evaluated similarly.

In general, given any $(s_1, s_2)$ pair, a coefficient responsiveness table for recording responsive or unresponsive coefficients for a range of coefficients can be obtained according to a quantization operation (e.g., quantization function $f$). For example, if the quantized coefficients are obtained from an MPEG-2 video stream, the range R=[0,1024]. It should be appreciated that the range depends on media stream encoding, such as MPEG, H.26x, and JPEG.

In one embodiment, the quantization operation is a uniform scalar quantizer with rounding to nearest as shown in Equation (6). In another embodiment, the quantization operation is a uniform scalar quantizer with rounding down as shown in Equation (7). For ease of explanation, the left side of Equations (6) and (7) is denoted as $L_j$ and right side is denoted as $U_j$. For both Equations (6) and (7), it can be proven that $L_j - U_j = 1$. In other words, there is at most one responsive coefficient in each interval. Therefore, Equations (6) and (7) can be used to generate a coefficient responsiveness table indicating the responsiveness for a coefficient.

Figure 3:
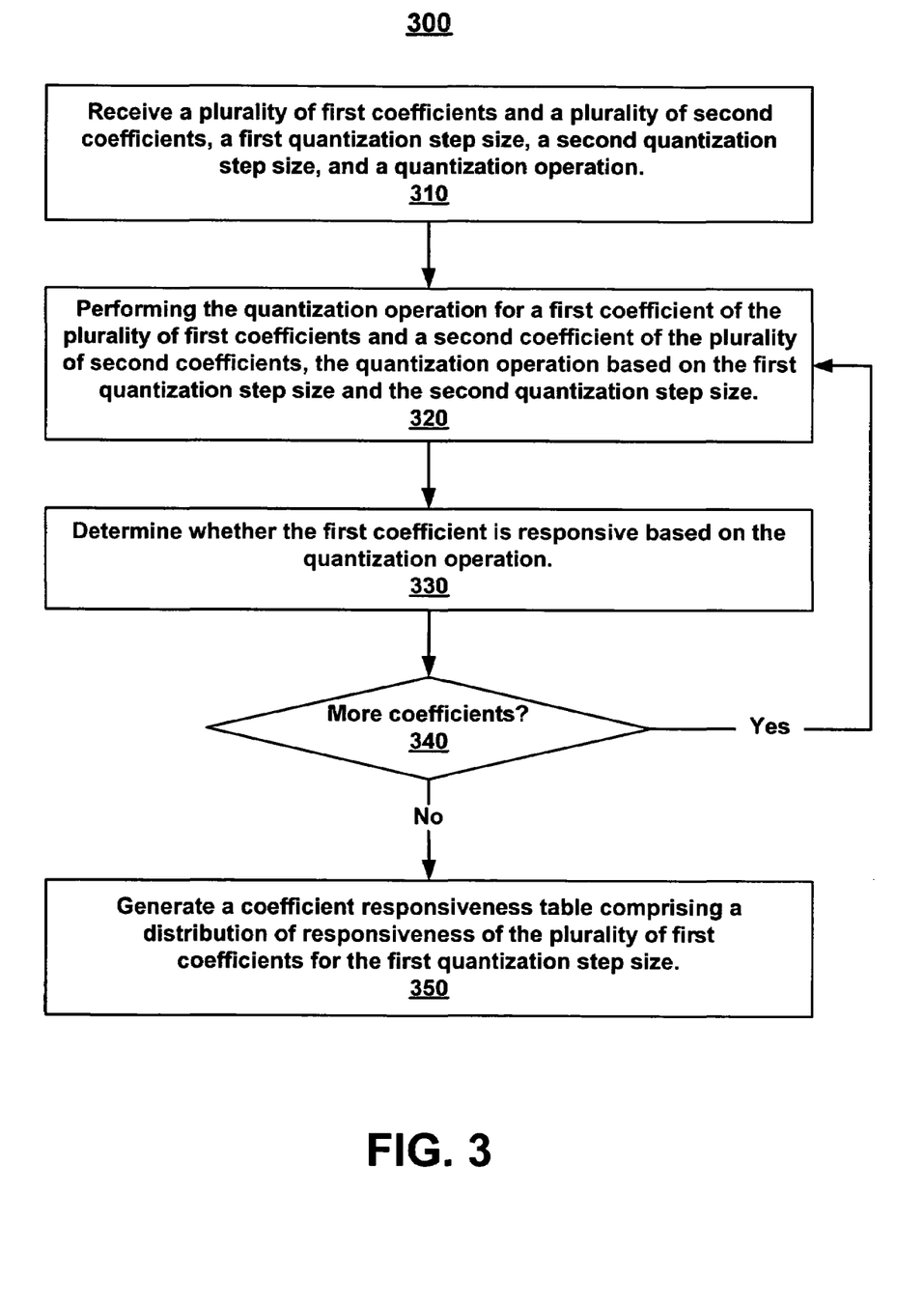
FIG. 3 illustrates a flow chart of a process for determining responsiveness of a coefficient of a media stream in accordance with an embodiment of the present invention.

FIG. 3 illustrates a flow chart of a process 300 for determining responsiveness of a coefficient of a media stream in accordance with an embodiment of the present invention. In one embodiment, process 300 is carried out by processors and electrical components (e.g., a computer system) under the control of computer readable and computer executable instructions. Although specific steps are disclosed in process 300, such steps are exemplary. That is, the embodiments of the present invention are well suited to performing various other steps or variations of the steps recited in FIG. 3.

At step 310, a plurality of first coefficients and a plurality of second coefficients associated with plurality of blocks of pixels, a first quantization step size, a second quantization step size, and a quantization operation are received. In one embodiment, the plurality of first coefficients are quantized coefficients and the plurality of second coefficients are transcoded coefficients. In one embodiment, the quantization operation is a uniform scalar quantizer with rounding to nearest. In another embodiment, the quantization operation is a uniform scalar quantizer with rounding down.

At step 320, the quantization operation is performed for a first coefficient of the plurality of first coefficients and a second coefficient of the plurality of second coefficients. The quantization operation utilizes the first quantization step size, the second quantization step size and the second coefficient. In one embodiment, the quantization operation determines whether the first coefficient falls within an interval defined by the first quantization step size, the second quantization step size and the second coefficient.

At step 330, it is determined whether the first coefficient is responsive based on the quantization operation. In one embodiment, if the coefficient falls within an interval as defined by the quantization operation, the first coefficient is identified as being responsive. Alternatively, if the coefficient does not fall within the interval as defined by the quantization operation, the first coefficient is identified as being unresponsive. In one embodiment, the quantization operation defines a lower bound and an upper bound. Based on the first quantization step size, the second quantization step size and the second coefficient, the lower bound and upper bound are determined. If lower bound is less than the first coefficient and the upper bound is greater than the first coefficient, the first coefficient is indicated as responsive.

At step 340, it is determined whether more coefficients require processing by the quantization operation. In one embodiment, it is determined whether the quantization operation has been performed on every combination of first coefficients of the plurality of first coefficients and second coefficients of the plurality of second coefficients. If there are more coefficients that require processing by the quantization operation, process 300 returns to step 320 with the next combination of first coefficients and second coefficients. Alternatively, if there are no more coefficients that require processing by the quantization operation, process 300 proceeds to step 350.

At step 350, a coefficient responsiveness table is generated comprising a distribution of responsiveness of the plurality of first coefficients for the first quantization step size. A first axis of the coefficient responsiveness table corresponds to the plurality of first coefficients and the second axis corresponds to the second quantization step size. It should be appreciated that the coefficient responsiveness table can be generated prior to the completion of step 340. That is, the coefficient responsiveness table can be generated one coefficient at a time, such that once responsiveness of a first coefficient is determined at step 330, the responsiveness is indicated in the coefficient responsiveness table.

Figure 4:
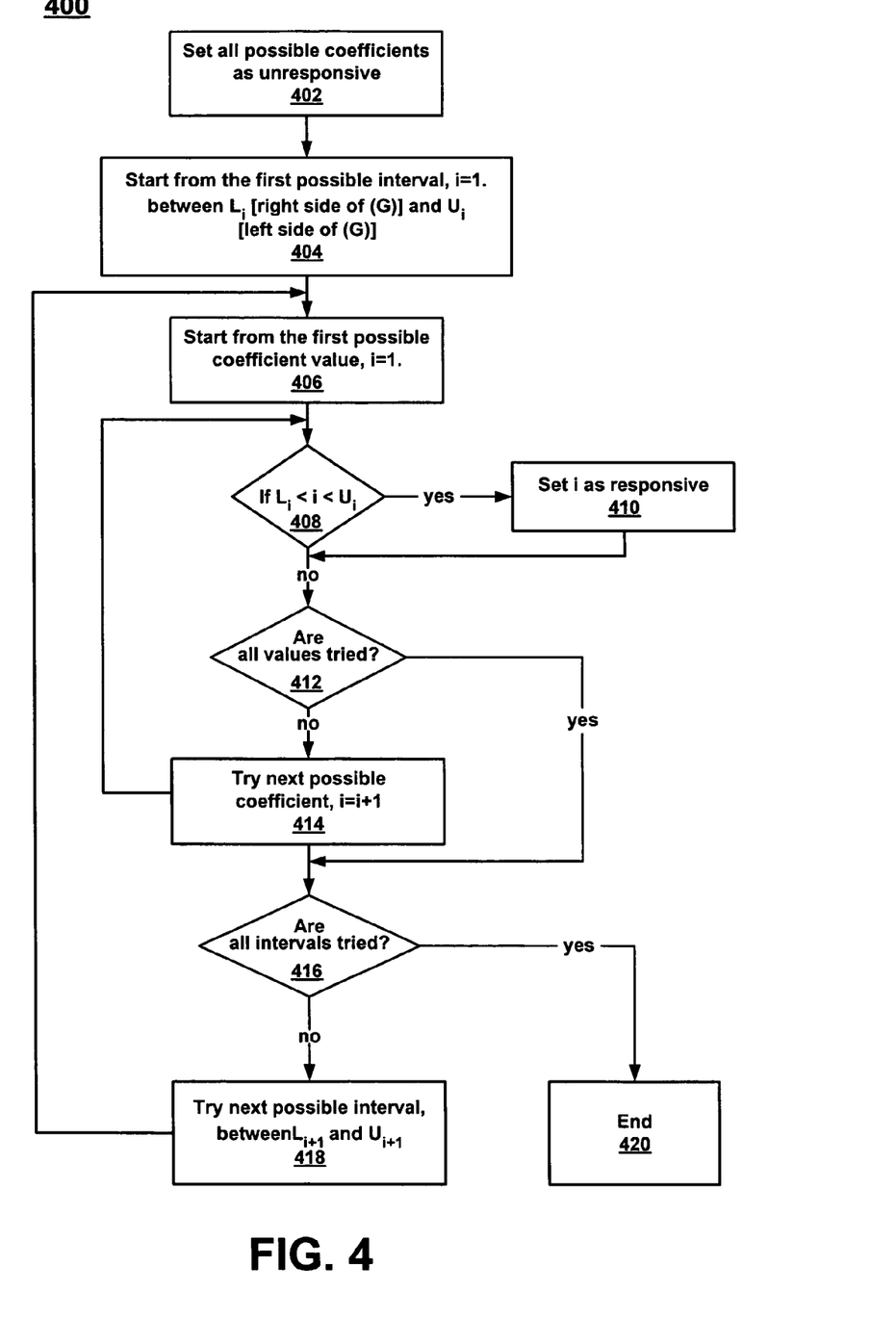
FIG. 4 illustrates a flow chart of a process for determining responsiveness of a coefficient of a media stream using a uniform scalar quantizer with rounding to nearest in accordance with an embodiment of the present invention.

FIG. 4 illustrates a flow chart of a process 400 for determining responsiveness of a coefficient of a media stream using a uniform scalar quantizer with rounding to nearest in accordance with an embodiment of the present invention. In one embodiment, process 400 is carried out by processors and electrical components (e.g., a computer system) under the control of computer readable and computer executable instructions. Although specific steps are disclosed in process 400, such steps are exemplary. That is, the embodiments of the present invention are well suited to performing various other steps or variations of the steps recited in FIG. 4.

At step 402 of FIG. 4, all possible quantized coefficients are set as unresponsive. At step 404, $L_j$ (e.g., the right side of Equation (6)) and $U_j$ (e.g., the left side of Equation (6)) are determined starting from the first interval where a transcoded coefficient of a plurality of transcoded coefficients is set equal to one (e.g., j=1). At step 406, the first possible quantized coefficient of the plurality of quantized coefficients is set equal to one (e.g., i=1).

At step 408, it is determined whether Equation (6) is satisfied for the quantized coefficient. In other words, it is determined whether the quantized coefficient falls within the interval of $L_j$ and $U_j$. If the quantized coefficient falls within the interval of $L_j$ and $U_j$, as shown at step 410, the quantized coefficient is set as responsive, and process 400 proceeds to step 412. Alternatively, if the quantized coefficient does not fall within the interval of $L_j$ and $U_j$ process 400 proceeds to step 412.

At step 412 it is determined whether all values of quantized coefficients have been processed at step 408. If all values of quantized coefficients have not been processed, as shown at step 414, the next possible quantized coefficient is selected and process 400 proceeds to step 408. Alternatively, if all values of quantized coefficients have been processed, process 400 proceeds to step 416.

At step 416 it is determined whether all intervals of $L_j$ and $U_j$ have been processed at step 408. If all intervals have not been processed, as shown at step 418, the next possible transcoded coefficient is selected and process 400 proceeds to step 408. Alternatively, if all intervals have been processed, process 400 proceeds to step 420. At step 420, process 400 ends.

Figure 5A:
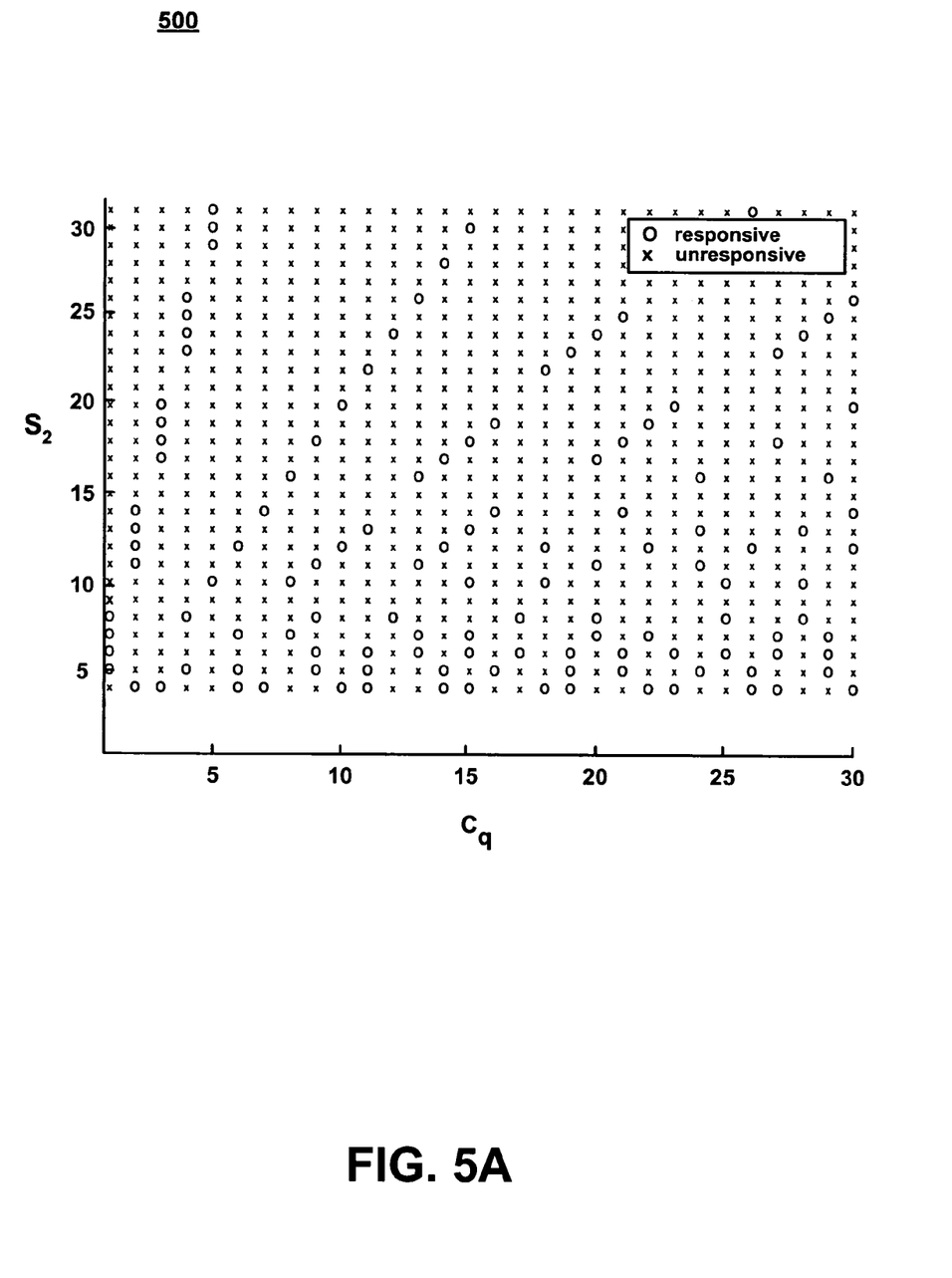
FIG. 5A illustrates a graph of an exemplary distribution of responsive and unresponsive coefficients using a uniform scalar quantizer with rounding to nearest in accordance with an embodiment of the present invention.

FIG. 5A illustrates a graph 500 of an exemplary distribution of responsive and unresponsive coefficients using a uniform scalar quantizer with rounding to nearest in accordance with an embodiment of the present invention. Graph 500 shows the actual distribution of responsive and unresponsive coefficients for an MPEG-2 video stream with a first quantization step size of three ($s_1=3$). The vertical axis indicates the second quantization step size $s_2$ which ranges from 1-31 in the case of MPEG-2 video streams, and the horizontal axis indicates the quantized coefficient $C_q$ (e.g., first coefficient), which ranges from 1-1024 in the case of MPEG-2 video streams. For simplicity, graph 200 only illustrates the first 30 quantized coefficients. As shown, 'o' indicates a responsive coefficient and 'x' indicates an unresponsive coefficient. Also, since the second quantization step size is greater than the first quantization step size, it should be understood that the responsiveness is only determined for second quantization step size from four through thirty-one. In one embodiment, graph 500 is generated for each first quantization step size. However, it should be appreciated that a three-dimensional table can be generated that includes all first quantization step sizes, second quantization step sizes, and quantized coefficients.

Figure 5B:
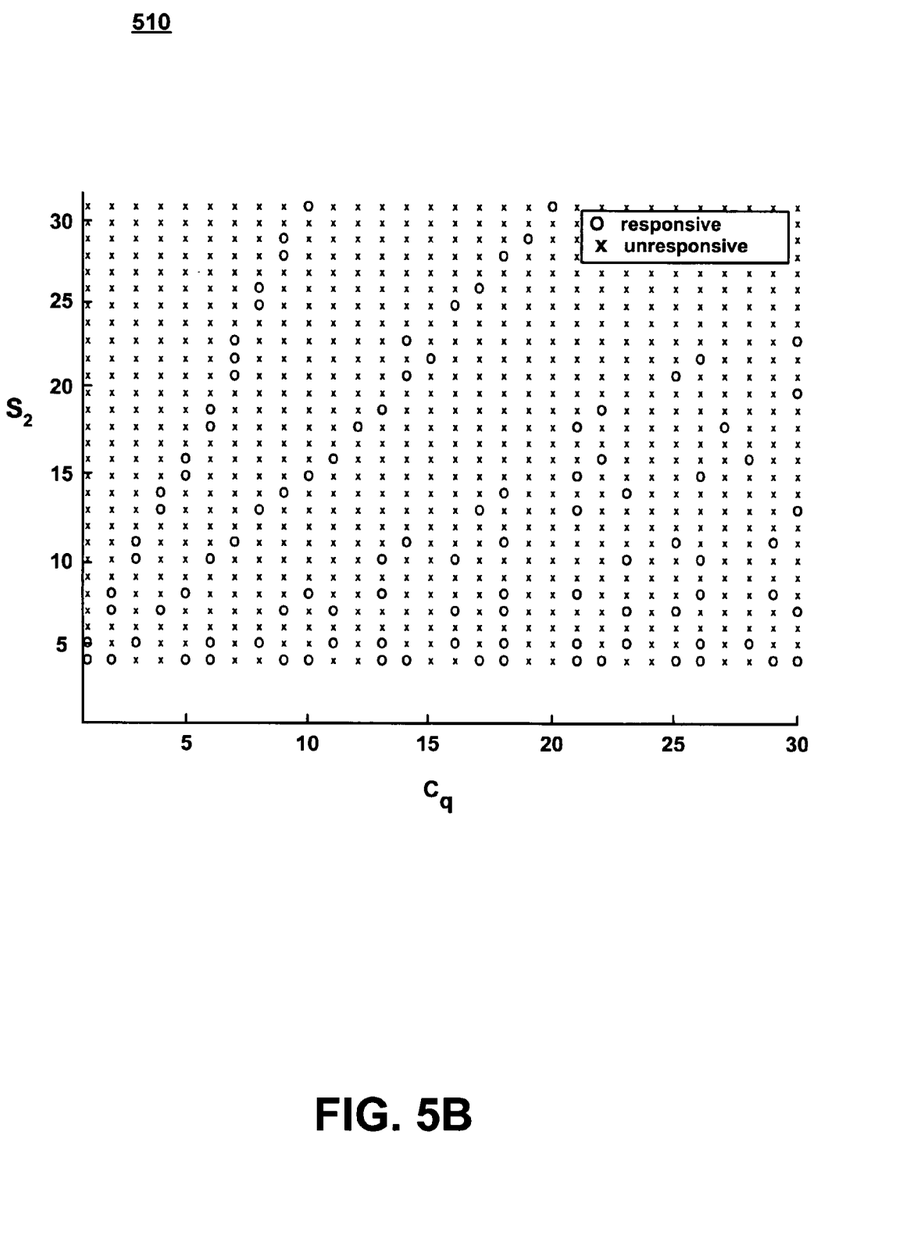
FIG. 5B illustrates a graph of an exemplary distribution of responsive and unresponsive coefficients using a uniform scalar quantizer with rounding down in accordance with an embodiment of the present invention.

FIG. 5B illustrates a graph 510 of an exemplary distribution of responsive and unresponsive coefficients using a uniform scalar quantizer with rounding down in accordance with an embodiment of the present invention. Graph 510 is generated in a manner similar to graph 500 of FIG. 5A, and is for an MPEG-2 video stream having a first quantization step size of three. Due to the different quantizer used, the responsiveness of coefficients is different than the quantizer used at graph 500.

It should be appreciated that second quantization step size $s_2$ is typically no smaller than first quantization step size $s_1$. Thus, the transcoded coefficient is smaller than the input quantized coefficient. In bit rate reduction transcoding, for any given i that belongs to $C_q$, after deblocking there are at most two possible requantization outputs. Using this information, a deblocking capable transcoder can be implemented that only performs a deblocking operation on responsive coefficients, thus facilitating efficient throughput of input coefficients.

Figure 6:
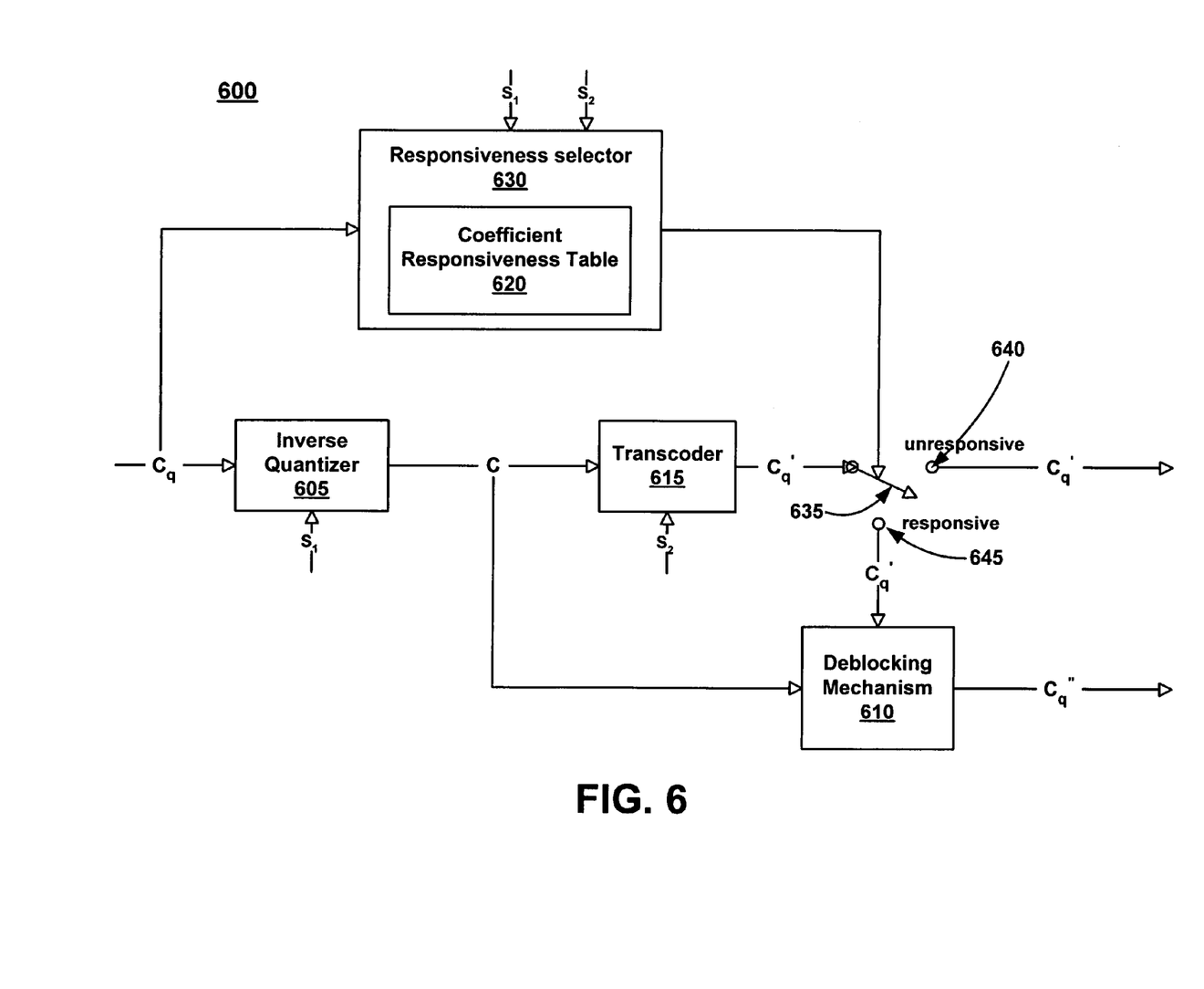
FIG. 6 illustrates a block diagram of transcoding system for deblocking responsive coefficients in accordance with an embodiment of the present invention.

FIG. 6 illustrates a block diagram of transcoding system 600 for deblocking responsive coefficients in accordance with an embodiment of the present invention. Transcoding system 600 utilizes requantization for bit rate reduction transcoding and has deblocking capability. Transcoding system 600 comprises inverse quantizer 605, coefficient responsiveness table 610, responsiveness selector 620, deblocking mechanism 610, and transcoder 615. It should be appreciated that transcoding system 600 may be implemented within a computer system.

Transcoding system 600 receives a coefficient associated with a block of pixels of a media stream. In one embodiment, the coefficient is a quantized coefficient $C_q$. In one embodiment, quantized coefficient $C_q$ is received from a compressed video stream. In one embodiment, quantized coefficient $C_q$ is a discrete cosine transform (DCT) coefficient. Inverse quantizer 605 is operable to perform an inverse quantization operation ($Q_1^{-1}$) on quantized coefficient $C_q$ using quantization step size $s_1$. Inverse quantizer 605 outputs dequantized coefficient C. In one embodiment, inverse quantizer operates in the same manner as inverse quantizer 105 of FIG. 1.

Dequantized coefficient C is transmitted to transcoder 615. Transcoder 615 is operable to perform a transcoding (e.g., quantization) operation ($Q_2$) on dequantized coefficient C using quantization step size $s_2$. Transcoder 615 outputs transcoded coefficient $C_q'$. In one embodiment, transcoder 615 operates in the same manner as transcoder 115 of FIG. 1.

Responsiveness selector 630 performs a table-lookup operation using quantized coefficient $C_q$ as an input, as well as quantization step sizes $s_1$ and $s_2$. In one embodiment, the table lookup operation is based on coefficient responsiveness table 620 which is generated beforehand. In one embodiment, coefficient responsiveness table 620 is generated as described at process 300 of FIG. 3 or process 400 of FIG. 4. Based on quantization step size $s_2$ proposed by a rate control module, an input coefficient i is mapped to a corresponding $C_q'$ of coefficient responsiveness table 620.

Responsiveness selector 630 performs a table-lookup operation and the output of 630 is used to control a switch arrow 635. If i that belongs to $C_q$ is unresponsive according to coefficient responsiveness table 620, switch arrow 635 is connected to unresponsive node 640, transcoded coefficient $C_q'$ is output. Alternatively, if i is responsive according to coefficient responsiveness table 620, switch arrow 635 is connected to responsive node 645. Subsequently, a deblocking process of deblocking mechanism 610 is applied on the transcoded coefficient $C_q'$ according to dequantized coefficient C. Transcoded coefficient $C_q'$ is modified by ±1 or zero, and is output as $C_q''$. In one embodiment, deblocking mechanism 610 operates in the same manner as deblocking mechanism 110 of FIG. 1. In one embodiment, a memory unit of transcoding system 600 is used to pass dequantized coefficient C to deblocking mechanism 610.

Method for Determining an Optimal Quantization Step Size for Transcoding a Media Stream If quantization step size $s_1$ is small, there is typically minimal blocking introduced into the video stream. However, if quantization step size $s_2$ is much greater than quantization step size $s_1$, there may be substantial blocking artifacts introduced. The distribution of responsive coefficients may become sparse with increasing quantization step size $s_2$. Noting that the interval between the lower and upper bounds in Equation (5) equals $s_2/s_1-1$, the following corollary can be derived. In general, for a uniform scalar quantizer, given first quantization step size $s_1$ and second quantization step size $s_2$, the number of unresponsive coefficients increases when $s_2/s_1$ increases. This corollary indicates that a deblocking operation has limited impact when requantization is much more coarser. In some special cases, no responsive coefficients are available at all. Note from the example shown in FIG. 5A that when $s_2=9$, no coefficients are responsive.

In general, for a uniform scalar quantizer, given first quantization step size $s_1$ and second quantization step size $s_2$, if $$s_2 = \begin{cases} (2k+1)s_1, & \text{round-to-nearest} \\ ks_1, & \text{round-down} \end{cases} \quad (8)$$

where k=(1, 2, . . . ), there are no responsive coefficients.

It is therefore important to avoid choosing second quantization step size $s_2$ as in Equation (8) if a deblocking-capable transcoder is desired. From the example shown in FIG. 5A, there are more responsive coefficients when second quantization step size $s_2=8$ or 10. Therefore, by altering the selection of second quantization step size $s_2$, the number of responsive coefficients may increase so that the deblocking can be more effective.

In one embodiment, a bigger or smaller quantization step size in the vicinity of quantization step size $s_2$ is selected, leading to possibly more responsive coefficients. To select an appropriate quantization step size, a plot of quantization error is generated. In one embodiment, the quantization error is plotted based on standard TM5 quantization procedure employed in the MPEG standard. Given the range of quantization step size $s_2$ from 1 to 31, and possible magnitudes of DCT coefficients from 0 to 2048, a quantization error table containing all possible quantization errors for each $(s_2, C_q)$ pair can be generated.

Figure 7:
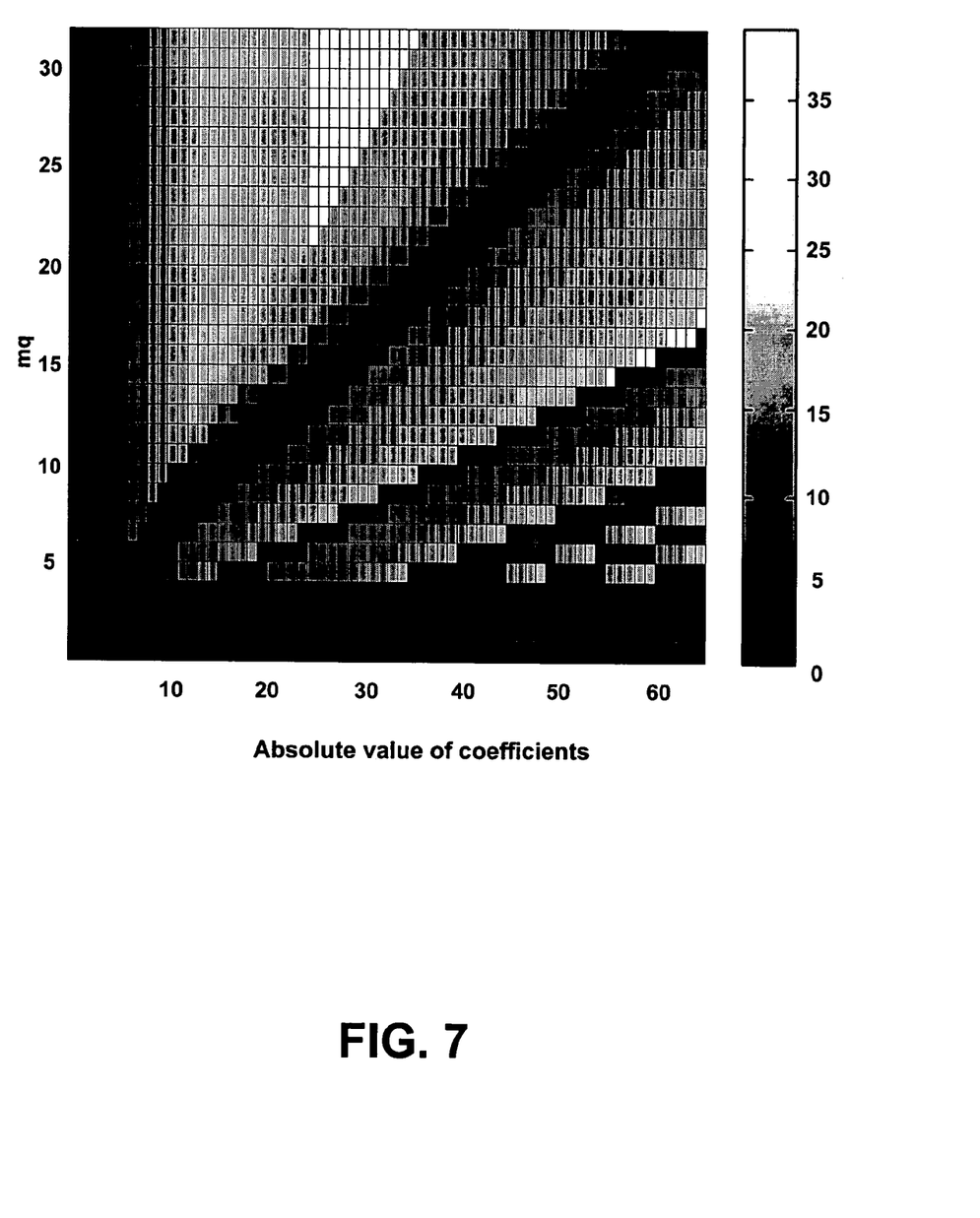
FIG. 7 illustrates an exemplary quantization error table in accordance with an embodiment of the present invention.

FIG. 7 illustrates an exemplary quantization error table 700 in accordance with an embodiment of the present invention. Specifically, quantization error table 700 shows the quantization error for DCT coefficients for values from 0 to 1028 using the MPEG standard. For simplicity, only the first 64 coefficients are shown. The quantizer function and the default intra quantizer matrix used in MPEG are considered here. The visualization of the table only shows the results for the (0,1), (1,0) and (1,1) coefficients (the value of these entries in the default quantizer matrix is 16). The troughs (darker cells) indicate smaller quantization error. For a vertical line (for example the vertical line for coefficient value at 40) in FIG. 7, multiple troughs are encountered, which indicates that a higher quantization step size $s_2$ value does not necessarily increase the quantization error. On the contrary, if quantization step size $s_2$ is selected carefully, the quantization error may be maintained or even reduced.

The quantization property described above proves valuable for the deblocking-capable transcoder. An optimal quantization step size $s_2$ can be selected to boost the number of responsive coefficients so that the deblocking mechanism (e.g., deblocking mechanism 110 of FIG. 1 or deblocking mechanism 610 of FIG. 6) can be more effective. Furthermore, the altered quantization step size maintains the bit rate and the quality of the coded pictures. Based on this, a deblocking-capable transcoder can be implemented with enhanced deblocking capability. The enhanced deblocking capability can be implemented in transcoding system 100 of FIG. 1 and transcoding system 600 of FIG. 6 by selecting an optimal second quantization step size $s_2$.

Figure 8:
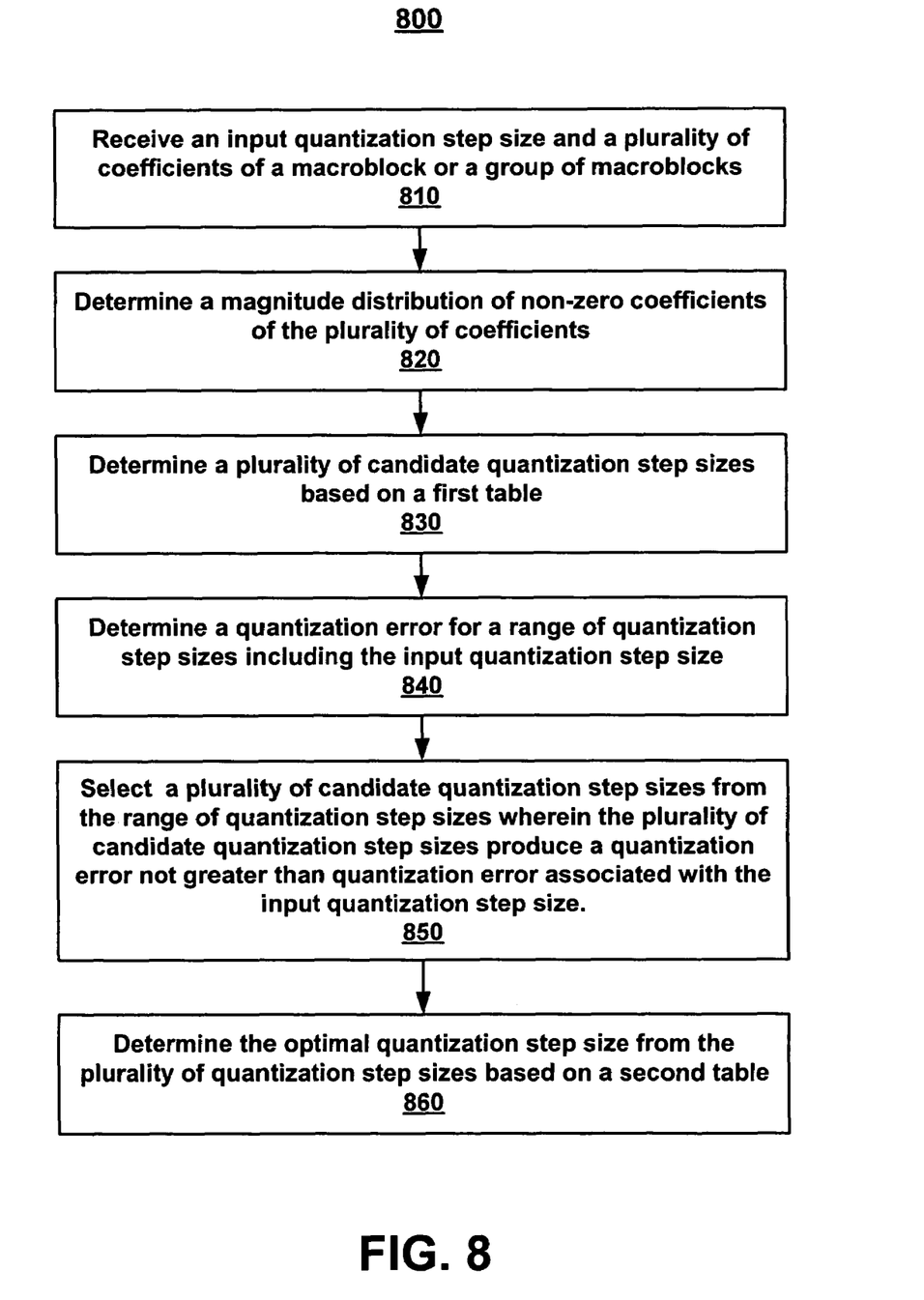
FIG. 8 illustrates a flow chart of a process for determining an optimal quantization step size in accordance with an embodiment of the present invention.

FIG. 8 illustrates a flow chart of a process 800 for determining an optimal quantization step size in accordance with an embodiment of the present invention. In one embodiment, process 800 is carried out by processors and electrical components (e.g., a computer system) under the control of computer readable and computer executable instructions. Although specific steps are disclosed in process 800, such steps are exemplary. That is, the embodiments of the present invention are well suited to performing various other steps or variations of the steps recited in FIG. 8.

At step 810, an input quantization step size and a plurality of coefficients of a macroblock are received. In one embodiment, an input quantization step size and a plurality of coefficients are received for a group of blocks (e.g., in the case of JPEG encoding).

At step 820, a magnitude distribution of non-zero coefficients of the plurality of coefficients is determined.

At step 830, a plurality of candidate quantization step sizes is determined based on a first table. In one embodiment, the first table is a quantization error table.

At step 840, a quantization error for a range of quantization step sizes including the input quantization step size is determined. In one embodiment, the range of quantization step sizes comprises all quantization step sizes between the input quantization step size plus three and the input quantization step size minus three. In other words, for quantization step size $s_2$, the range of quantization step sizes ranges from $s_2-3$ to $s_2+3$.

At step 850, a plurality of candidate quantization step sizes from is selected form the range of quantization step sizes. In one embodiment, the plurality of candidate quantization step sizes produce a quantization error not greater than quantization error associated with the input quantization step size.

At step 860, the optimal quantization step size is determined from said plurality of quantization step sizes based on a second table. In one embodiment, the second table is a coefficient responsiveness table. In one embodiment, the optimal quantization step size is selected as a quantization step size of plurality of quantization step sizes that has the highest number of responsive coefficients according to the coefficient responsiveness table.

It should be appreciated that in the case of MPEG, one quantization step size $s_2$ is applied to the quantization of 6 to 12 blocks in a macroblock. The distribution of non-zero coefficients is obtained considering all the blocks. Weighting factors can be assigned to coefficients at different frequencies based on their importance to the reconstruction quality. In one embodiment, using the lower frequency coefficients (e.g., coefficients in the upper left 2×2 in a block) can be implemented.

Various embodiments of the present invention provide an analytical model for identifying transform coefficients that are responsive to deblocking in a video transcoding process. A method that enables a transcoder to avoid unnecessary deblocking operations in the transcoding process is provided. An optimal quantizer selection method is also provided to increase the number of responsive coefficients so that the deblocking capability of the transcoder is enhanced.

Embodiments of the present invention, a method for deblocking and transcoding a media stream, are thus described. While the present invention has been described in particular embodiments, it should be appreciated that the present invention should not be construed as limited by such embodiments, but rather construed according to the following claims.

What is claimed is:

1. A method for deblocking and transcoding a media stream, said method comprising:
receiving a coefficient associated with a block of pixels of said media stream at a transcoding computer system;
selectively performing a deblocking operation on said coefficient to generate a second coefficient at said transcoding computer system, wherein said deblocking operation is performed on said coefficient if it is determined that said coefficient is responsive to said deblocking operation; and
performing quantization on said second coefficient to generate a transcoded coefficient at said transcoding computer system.

2. The method as recited in claim 1 wherein said coefficient is a quantized coefficient.

3. The method as recited in claim 2 wherein said receiving said coefficient comprises:

receiving said quantized coefficient from a pre-encoded bit stream;

performing inverse quantization on said quantized coefficient to generate a first dequantized coefficient, said inverse quantization having a first step size.

4. The method as recited in claim 3 wherein said quantization has a second step size, wherein said second step size is greater than said first step size.

5. The method as recited in claim 2 wherein said quantized coefficient is a discrete cosine transform (DCT) coefficient.

6. The method as recited in claim 4 wherein said performing said deblocking operation comprises:

determining whether said first dequantized coefficient is responsive;

if said first dequantized coefficient is responsive, deblocking said first dequantized coefficient such that said second coefficient is a deblocked coefficient; and if said first dequantized coefficient is not responsive, said second coefficient is said first dequantized coefficient.

7. The method as recited in claim 6 wherein said determining whether said first dequantized coefficient is responsive comprises:

accessing a table based on said first step size, said table comprising a distribution of at least one responsive coefficient based on said second step size; and determining whether said first dequantized coefficient at said second step size is responsive.

8. The method as recited in claim 4 further comprising determining an optimal value for said second step size based on quantization error for said quantized coefficient at said transcoding computer system.

9. A deblocking-capable transcoder comprising:

an inverse quantizer for receiving a quantized coefficient associated with a block of pixels of said media stream and performing an inverse quantization operation on said quantized coefficient to generate a first dequantized coefficient, said inverse quantization having a first step size;

a responsiveness selector for determining whether said first dequantized coefficient is responsive to a deblocking operation and if it is determined that said first dequantized coefficient is responsive said deblocking operation, allowing said deblocking operation to be applied to said first dequantized coefficient;

a deblocking mechanism for performing said deblocking operation on said dequantized coefficient to generate a second coefficient if said first dequantized coefficient is responsive; and a transcoder for performing quantization on said second coefficient to generate a transcoded coefficient.

10. The deblocking-capable transcoder as recited in claim 9 wherein said quantization has a second step size, wherein said second step size is greater than said first step size.

11. The deblocking-capable transcoder as recited in claim 9 wherein said quantized coefficient is a discrete cosine transform (DCT) coefficient.

12. The deblocking-capable transcoder as recited in claim 9 wherein said responsiveness selector is operable to determine whether said first dequantized coefficient is responsive by accessing a coefficient responsiveness table.

13. A method for determining responsiveness of a coefficient of a media stream, said method comprising:

receiving a plurality of first coefficients and a plurality of second coefficients associated with plurality of blocks of pixels of said media stream, a first quantization step size, a second quantization step size, and a quantization operation at a transcoding computer system;

performing said quantization operation for a first coefficient of said plurality of first coefficients and a second coefficient of said plurality of second coefficients at said transcoding computer system, said quantization operation based on said first quantization step size and said second quantization step size; and determining whether said first coefficient is responsive to a deblocking operation based on said quantization operation at said transcoding computer system.

14. The method as recited in claim 13 wherein said quantization operation is a uniform scalar quantizer with rounding to nearest.

15. The method as recited in claim 13 wherein said quantization operation is a uniform scalar quantizer with rounding down.

16. The method as recited in claim 13 wherein said determining whether said first coefficient is responsive to a deblocking operation based on said quantization operation comprises:

determining a lower bound based on said quantization operation;

determining an upper bound based on said quantization operation; and provided said lower bound is less than said first coefficient and said upper bound is greater than said first coefficient, indicating said first coefficient as responsive to a deblocking operation for said first quantization step size and said second quantization step size.

17. The method as recited in claim 13 further comprising repeating said performing and said determining for said plurality of first coefficients.

18. The method as recited in claim 17 further comprising generating a coefficient responsiveness table comprising a distribution of responsiveness of said plurality of first coefficients for said first quantization step size at said transcoding computer system, wherein a first axis corresponds to said plurality of first coefficients and said second axis corresponds to said second quantization step size.

19. The method as recited in claim 13 wherein said plurality of first coefficients are quantized coefficients and said plurality of second coefficients are transcoded coefficients.

20. A method for determining an optimal quantization step size, said method comprising:

receiving an input quantization step size and a plurality of coefficients of a macroblock at a transcoding computer system;

determining a magnitude distribution of non-zero coefficients of said plurality of coefficients at said transcoding computer system;

determining a plurality of candidate quantization step sizes based on a first table at said transcoding computer system; and determining said optimal quantization step size from said plurality of quantization step sizes based on a second table at said transcoding computer system, wherein said optimal quantization step size has a highest number of coefficients of said plurality of coefficients that would be responsive to a deblocking operation.

21. The method as recited in claim 20 wherein said first table is a quantization error table.

22. The method as recited in claim 20 wherein said second table is a coefficient responsiveness table.

23. The method as recited in claim 20 wherein said determining said plurality of candidate quantization step sizes comprises:

determining a quantization error for a range of quantization step sizes including said input quantization step size; and selecting a plurality of candidate quantization step sizes from said range of quantization step sizes wherein said plurality of candidate quantization step sizes produce a quantization error not greater than quantization error associated with said input quantization step size.

24. The method as recited in claim 23 wherein said range of quantization step sizes comprises all quantization step sizes between said input quantization step size plus three and said input quantization step size minus three.

25. The method as recited in claim 20 wherein said determining said optimal quantization step size comprises selecting said optimal quantization step size as a quantization step size from said plurality of quantization step sizes that having the highest number of responsive coefficients.

* * * * *